United States Patent [19]
Aquilina

[11] Patent Number: 5,927,779
[45] Date of Patent: Jul. 27, 1999

[54] TOOL, A KIT AND A METHOD FOR ASSEMBLING A TOOL, HAVING AN ELONGATE SHAFT MEMBER AND A BLADE MEMBER

[75] Inventor: Paul Aquilina, Kitchener, Canada

[73] Assignee: Melnor Canada Ltd., Winchester, Va.

[21] Appl. No.: 08/961,769

[22] Filed: Oct. 31, 1997

[51] Int. Cl.$^6$ .................................. A01B 1/22; B25G 3/24
[52] U.S. Cl. .................................. 294/49; 294/57; 403/282
[58] Field of Search .............................. 294/49, 51, 54.5, 294/57; 403/279, 282, 361, 376, 379.2; 76/113, 119

[56] References Cited

U.S. PATENT DOCUMENTS

| | | | |
|---|---|---|---|
| 993,015 | 5/1911 | Bengtsson | 294/51 |
| 2,047,485 | 7/1936 | McBrady | 294/57 |
| 4,406,559 | 9/1983 | Geertsema et al. | 294/57 |
| 4,691,954 | 9/1987 | Shaud | 294/57 |
| 4,865,372 | 9/1989 | Gabriel | 294/49 |
| 5,120,098 | 6/1992 | Childress | 294/49 |
| 5,795,000 | 8/1998 | Aldorasi | 294/57 |

FOREIGN PATENT DOCUMENTS 1261195   9/1989   Canada.

*Primary Examiner*—Dean Kramer
*Attorney, Agent, or Firm*—Gowling, Strathy & Henderson; D. Doak Horne

[57] ABSTRACT

A kit for assembling a tool and the resulting tool which includes a shaft member, a blade member and a locking clip member securing the shaft member to the blade member. The shaft has an orifice extending into its periphery toward a lower end thereof. The blade member has an aperture for receiving the lower end of the shaft member. The blade member has a first orifice extending therethrough and a second orifice which registers with the orifice in the shaft member when the shaft member is inserted fully into the blade member. The locking clip member is non-resiliently deformable and has a first end which may be bent to lodge the clip in the first orifice of the blade member. The locking clip member has a second end, opposite the first end, for insertion through the orifice of the shaft member and the second orifice of the blade member to lock the blade member to the shaft member. A method for assembling the kit is also provided.

19 Claims, 5 Drawing Sheets

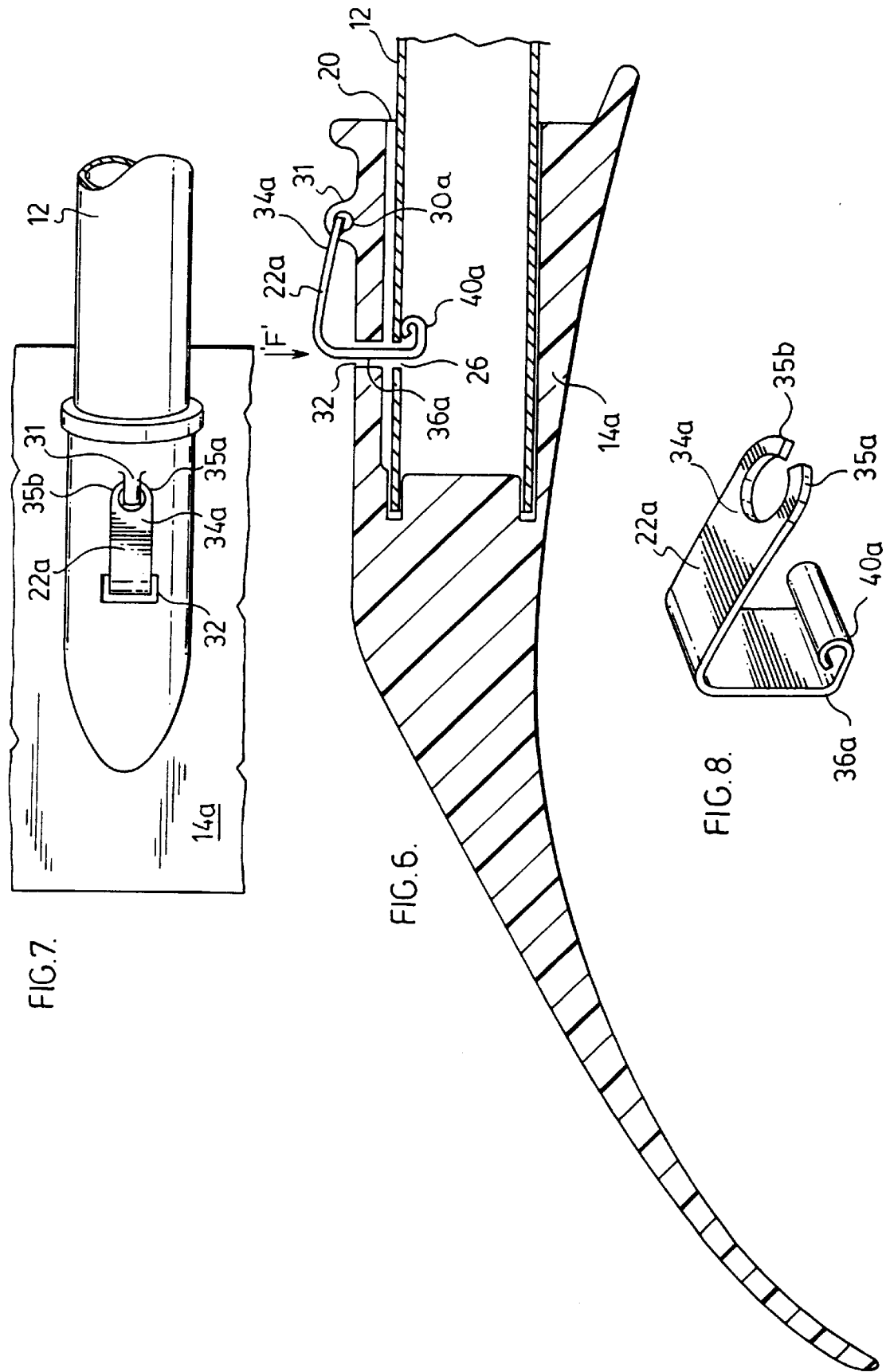

TOOL, A KIT AND A METHOD FOR ASSEMBLING A TOOL, HAVING AN ELONGATE SHAFT MEMBER AND A BLADE MEMBER

1. FIELD OF THE INVENTION

The invention relates to tools generally, and more particularly to a kit for manually assembling a tool, a manually assemblable tool, and a method for manually assembling such tool.

2. BACKGROUND OF THE INVENTION

Hand tools, such as shovels and rakes, typically have two or more components such as a blade member and an elongate shaft member, which need to be attached together prior to sale and use of such implements. The blade and shaft members are usually affixed to each other using bolting or screwing and the like. Such requires the use of other tools, such as wrenches and/or screwdrivers, making assembly of such tool difficult or impossible if such wrenches and/or screwdrivers are not readily available.

Also, for reasons of lower manufacturing costs and ease of shipping and handling, it may be desired to provide a two or more component tool to a customer in dis-assembled or "knock-down" form, to allow for more efficient shipping and boxing of the tools from the place of manufacture. Upon delivery at a retail store, or upon purchase of such tool by a customer, assembly of such tool is then required. In such circumstances where retailers and customers are assembling tools from a kit or dis-assembled form, it is desirous for the assembly to require as few tools as possible and preferably no use of tools being required. Accordingly, for convenience to retail customers and the purchasing public, tool designs which require only manual assembly and no use of other tools are particularity desirable.

Tools adapted to allow manual assembly of a wooden shaft member to a blade member without the use of other tools are known. For example, Canadian Patent 1,261,125 (likewise to the within inventor Paul C. Aquilina) provides for a specially configured clip that is adapted for use in retaining a wooden shaft member to a blade member of a tool. The clip, particularity in the second embodiment shown in FIGS. 3–6 thereof, relies on an angled ramp 12 and a tongue 11 "digging into" the wooden shaft member 2 as a means of permitting the clip to retain the wooden shaft member coupled to the structural portion 5 of the tool.

Notably, however, due to growing shortages of wood and the increased expense of wood, and also due to the increased strength of metal as opposed to wood, it is increasingly common for tool manufacturers to utilize metal shafts for tools. Disadvantageously, however, existing designs which allow for manual assembly of a wood or steel shaft member to a blade member, such as the clip design taught in Canadian Patent 1,261,125 discussed above, are completely inoperable when a shaft that is substantially inpenetrable, such as metal, is employed. This is due to the inability of the clip member (usually of metal) to operate in the same manner as it does with wood, namely to "dig into" the shaft member to prevent disengagement with the blade member.

Accordingly, a real need exists for a kit, a tool itself, and a method for assembling such tool, to allow manual assembly of such tool where the shaft is of a substantially inpenetrable material, such as metal.

3. BRIEF SUMMARY OF THE INVENTION

In order to advantageously provide for manual assembly of a tool having an elongate shaft member and a blade member without the use of other tools, the present invention in one of its broad aspects comprises a kit for manual assembly of such tool, wherein the elongate shaft member, proximate a lower distal end thereof possesses an orifice situated on a periphery of the shaft member. The blade member is configured so as to comprise:

i) an aperture, adapted to fittingly receive there within the lower distal end of the shaft member; and ii) a first and second orifice, longitudinally spaced apart, the second orifice located on said blade member so as to mutually overlie the orifice in the shaft member when the shaft member is fittingly received in the aperture in the blade member.

A locking clip member is further provided, a first distal end thereof being adapted to pass through the first orifice to permit securement of the clip member to the blade member, and a second opposite distal end being adapted to pass through the second orifice and the orifice in the shaft member to thereby lockingly secure the shaft member within the aperture of the blade member.

It is contemplated that the first distal end of the clip member be adapted to be non-resiliently deformed to permit securement to the blade member. In a first embodiment, the first distal end is adapted to be inserted through the first orifice in the blade member and subsequently bent (either manually or by use of a tool), so as to allow the clip to be retained on the blade member. However, in a preferred embodiment, the first distal end of the clip member is adapted to be inserted into the first orifice in the blade member, and when the shaft member is inserted into the aperture, the first distal end is adapted to contact the shaft member and be deformed by the shaft member so as to become secured to the blade member. Advantageously this further refinement avoids the need to manually (or by use of a tool) deform the first distal end of the clip to secure it to the blade member, since the deformation is done by the shaft member upon insertion of the shaft member into the aperture in the blade member. The second (opposite) distal end of the clip member may then be pressed through the second orifice in the blade member and through the orifice in the shaft member, thereby retaining the shaft member in locked engagement to the blade member. The shaft member is prevented from being slidably removed from the aperture in the blade member by the second distal end of the clip member.

In a second aspect of the present invention, a tool is provided, comprising:

i) an elongate shaft member, proximate a lower distal end thereof having an orifice situated on a periphery of the shaft member;

ii) a blade member having an aperture, and a shaft member inserted within such aperture, further having means to prevent shaft rotation, wherein such shaft rotation prevention means matingly engages a corresponding surface on the shaft member when the shaft member is inserted in the aperture. Longitudinally spaced apart first and second orifices are provided, with the second orifice mutually overlying the orifice situate in said shaft member; and iii) a locking clip member is further provided, a first distal end thereof inserted through the first orifice, and a second opposite distal end inserted through each of the second orifice at the orifice in the shaft member, so as to lockingly secure the shaft member within the aperture.

In a preferred embodiment the clip member is deformed so as to be secured to the blade member. In yet a further refinement, the first distal end of the clip member, when inserted in the first orifice in the blade member, and the shaft member subsequently inserted into the aperture is adapted to contact the shaft member and be deformed, thereby securing the clip member to the blade member. The first distal end in such further embodiment, upon deformation, is sandwiched between the shaft member and side surfaces of the aperture within the blade member, causing the clip member to be secured to the blade member. This latter refinement has the distinct and important advantage that the tool may be assembled by hand, without the use of any tools to maintain the clip member in securement to the blade member.

While the locking clip member will not only prevent axial dislocation of the shaft member from within the aperture of the blade member, but also act as a shaft rotation prevention means adapted to matingly engage a corresponding surface on the shaft member, namely the orifice therein, so as to thereby prevent angular rotation of the shaft member within the aperture, in a preferred embodiment the shaft rotation means comprises indentation means on the shaft member and raised protuberance means within the aperture, wherein the raised protuberance means are adapted to matingly engage the indentation means when the shaft member is inserted within the aperture, thereby preventing angular rotation of the shaft member within the aperture. In the preferred embodiment the indentation means comprises a pair of indentations, and the raised protuberance means comprises a pair of protuberances or raised portions, which together matingly abut each other to prevent angular rotation of the shaft member within the blade member.

In a further preferred embodiment the clip member possesses means to retain its second distal end in resilient biased engagement within the orifice in the shaft member. Typically such means comprises a knurled portion at the extremety of the second distal end or the clip member which is resiliently biased against one edge of the orifice in the shaft, thereby preventing its removal from the orifice, and thereby preventing the shaft from being withdrawn from the aperture in the blade member.

In a further aspect of the present invention, a method for manual assembly of a tool from a kit as described above is expressly provided. Such method comprises:

i) placing the first end of the locking clip member through the first orifice in the blade member;

ii) locating the lower distal end of the shaft member within the aperture in the blade member, and rotating the shaft member relative to the blade member to allow the second orifice in the blade member to mutually overlie the orifice in the shaft member; and iii) pressing the second distal end of the clip member through the second orifice in the blade member and into the orifice in the shaft member to thereby cause the shaft member to become lockingly engaged to the blade member.

In a further preferred embodiment, where the tool is provided with shaft rotation prevention means in the form of raised protuberance means adapted to matingly engage indentation means on the shaft member at a unique angular orientation in which the second orifice mutually overlies the orifice in the shaft member, such method further comprises rotating the shaft member relative to the blade member to allow the raised protuberances in the aperture to matingly engage, at a unique angular orientation the indentations in the lower distal end of the shaft member, thereby allowing complete insertion of the shaft member in the aperture and simultaneously allowing the second orifice in the blade member to mutually overlie the orifice in the shaft member.

4. DESCRIPTION OF THE DRAWINGS

Further advantages and permutations will appear from the following detailed description of various preferred embodiments of the invention, taken together with the accompanying drawings, in which:

FIG. 6 is a cross-sectional view similar to the cross-sectional views of the invention shown in FIGS. 2A and 2B, showing the implementation of a different embodiment of the clip member of the present invention;

FIG. 7 is a view looking down on FIG. 6 in the direction shown by arrow "F"; and FIG. 8 is a perspective view of the embodiment of the clip member shown in FIGS. 6 and 7.

5. DETAILED DESCRIPTION OF THE INVENTION

Figure 1:
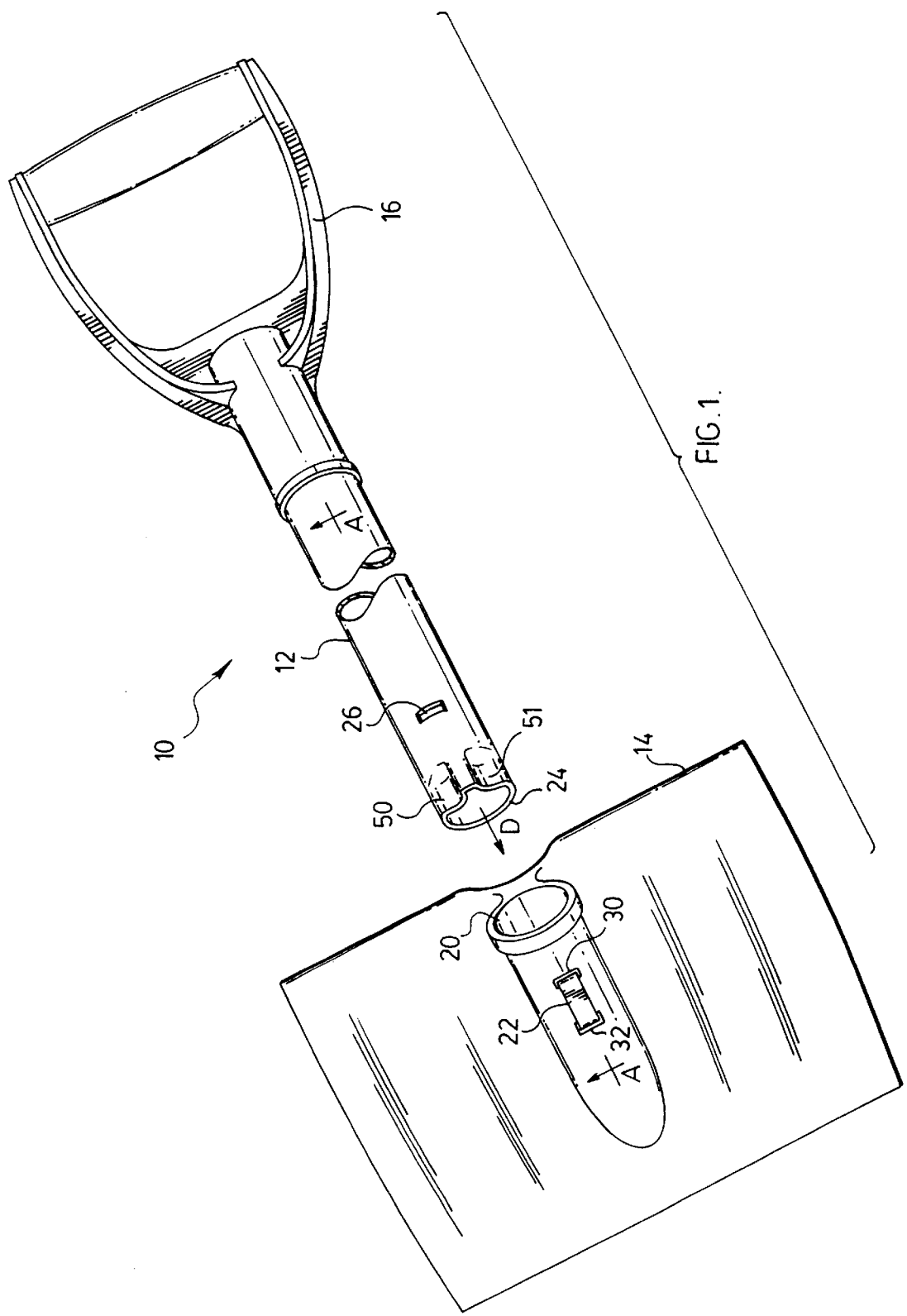
FIG. 1 is a side elevation view of a kit for a tool, in partially assembled state.

FIG. 1 shows in kit form the component parts of a tool 10, namely a shovel having an elongate shaft 12 and a blade 14, which may be manually assembled without the use of other tools. Although a shovel is depicted, the invention herein described equally applies to all manual tools comprising two or more components, such as blade and a shaft, which need to be assembled together in order for the tool to be utilized. The tool 10 of the present invention, the kit, and a method for assembling such tool 10, thus applies equally to all two-component implements such as rakes, hoes, and shovels and the like.

A handle 16, typically of plastic, may also be provided for the tool 10, as shown in FIG. 1. Such handle 16 may be affixed to the shaft 12 in the same manner as hereinafter described for the shaft 12 to be affixed to the blade 14 of the tool 10, and all methods and techniques described herein for attaching a blade 14 to a shaft 12 apply equally to attaching a handle 16 to a shaft 12 of a tool 10, and as such will not be further differentiated herein.

The shaft 12 shown in FIG. 1 is generally cylindrical and tubular, but other solid shapes, such as a generally rectangular or prismatic configuration, may likewise be employed. It is contemplated that the material of the shaft 12 be metallic (tubular steel is preferred), since the invention is particularly adapted for retaining substantially inpenetrable metal shafts 12 to blades 14, but penetrable materials, such as wood, may be utilized in the present invention.

Figure 2A:
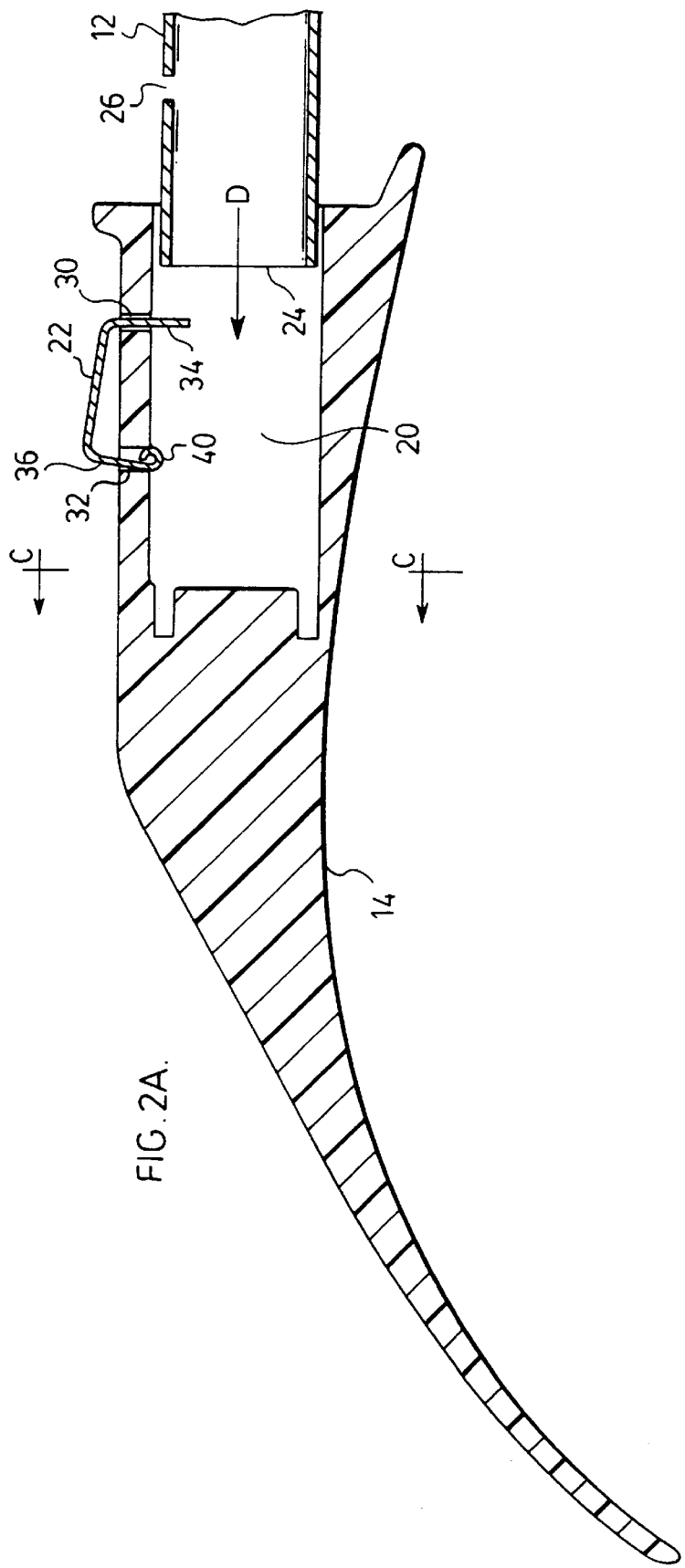
FIG. 2A is a cross-sectional view of the kit for a tool of FIG. 1, taken along plane A—A of FIG. 1, prior to insertion of the shaft member into the aperture of the blade member.
Figure 2B:
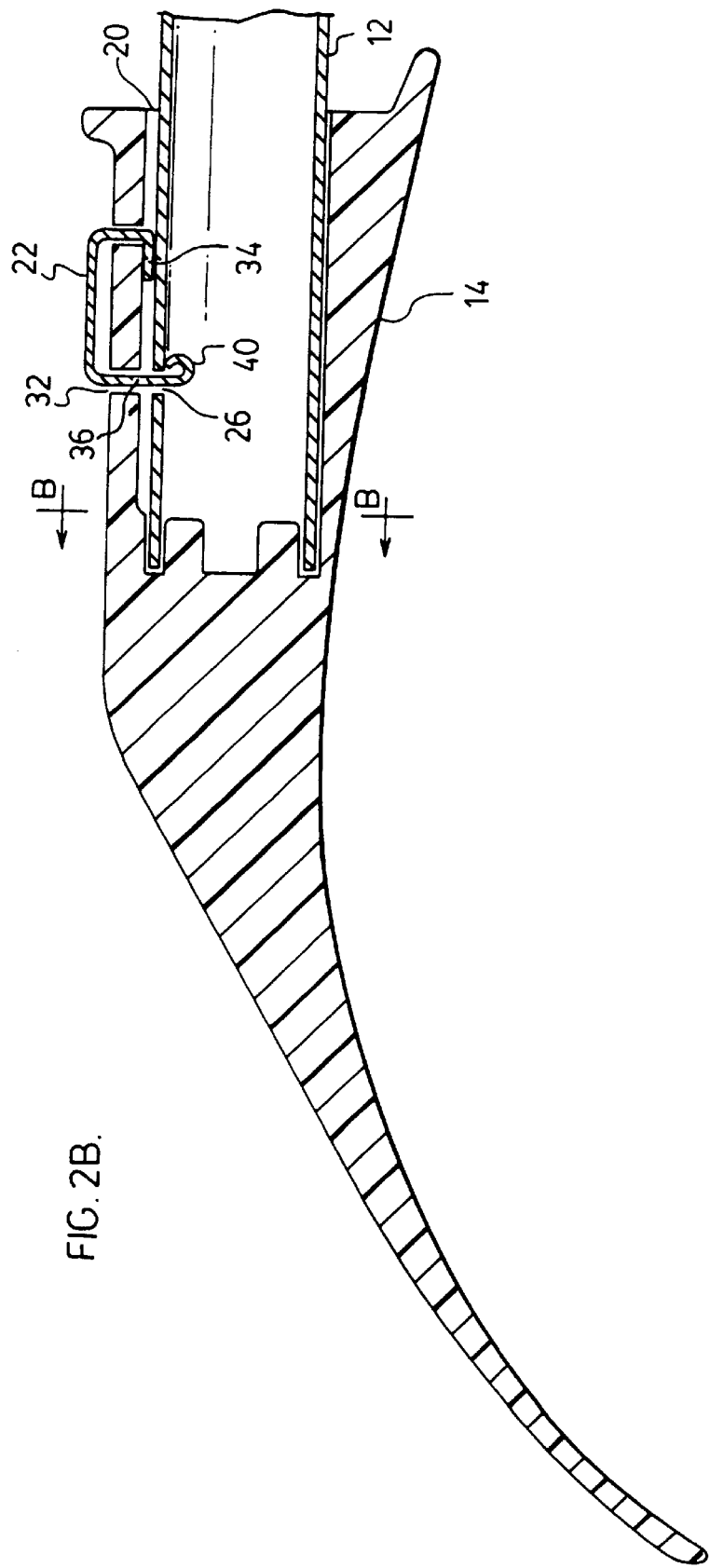
FIG. 2B is a cross-sectional view of the kit for a tool of FIG. 1, taken along plane A—A of FIG. 1, after insertion of the shaft member into the aperture of the blade member, showing the clip member in position retaining the shaft in locked engagement with the blade member.

The shaft 12 is adapted to be fittingly received and/or slidably inserted within an aperture 20 within the blade 14 as shown in the direction of arrow "D" in FIGS. 1 and 2A, and lockingly retained within the aperture 20 by a locking clip member 22, as shown in FIG. 2B.

The shaft 12, proximate a lower distal end 24 thereof, possesses an orifice 26 situated on the periphery of the shaft 12, as may be seen in FIG. 1 and FIG. 2A. The lower distal end 24 is adapted to be inserted within the aperture 20 within blade 14.

Longitudinally spaced apart, first and second orifices 30, 32, respectively, are provided. The second orifice 32 on the blade 14 is located so as to mutually overlie orifice 26 in the shaft 12 when the shaft 12 is slidably inserted in aperture 20, as shown in FIG. 2B.

To assemble the kit comprising the aforementioned components for the shovel 10 of the present invention, a first distal end 34 of the locking clip member 22 is inserted in the first orifice 30 on the shovel blade 14. Thereafter, the shaft 12 is slidably inserted in aperture 20, in the direction shown in arrow "D" (see FIGS. 1 and 2A). Insertion of the shaft 12 to such depth, as shown most clearly in FIG. 2B, causes the first distal end 34 of the locking clip member 22 to be bent (deformed), and further sandwiched between the shaft 12 and the side surface of aperture 20, causing the clip member 22 to be secured to the blade 14. The shaft 12 is subsequently angularity rotated relative to the blade 14, to align the second orifice 32 so as to mutually overlie the orifice 26 in the shaft 12. It is then possible to manually depress the second distal end 36 of clip member 22 through both orifices 32 and 26; the clip member 22, typically of metal bending (deforming) under such manual pressure as the second distal end 36 passes into the orifice 26 in shaft 12. The first distal end 34 of clip member 22 remains sandwiched between the shaft 12 and the sides of the aperture 20, as shown in FIG. 2B.

Figure 5:
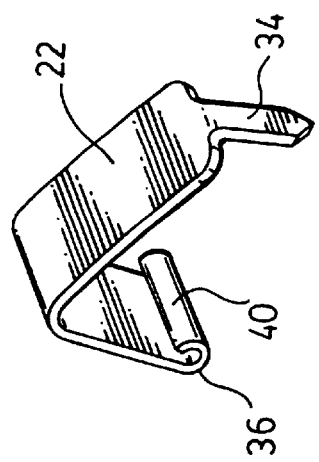
FIG. 5 is a perspective view of the preferred configuration for the clip member of the present invention.

In a preferred embodiment the second distal end 36 of the clip member 22 possesses a knurled edge 40, as shown in FIG. 5, which is biased towards the first distal end 34 (see FIG. 2A), which when pushed through said orifice 26 tends to underlie a portion of the shaft 12, immediately adjacent such orifice 26, as shown in FIG. 2B. Such feature assists in keeping the second distal end 36 of clip 22 within orifice 26, and makes removal of the second distal end 36 of clip 22 difficult, thereby ensuring that the shaft 12 remains in locked engagement within aperture 20 of blade 14.

In such manner the shovel 10 of the present invention may be manually assembled without the use of tools.

In a second less preferred but alternative embodiment of the invention, generally depicted in FIGS. 6–8, an alternative design for a clip member 22a is utilized (see FIG. 8). In order to assemble the shovel 10 using the clip member of the configuration shown in FIG. 8, the first distal end 34a of clip 22a is inserted within first orifice 30a. First distal end 34a are actually a pair of tabs 35a, 35b (see FIG. 7) which may be squeezed together manually but preferrably by a tool such as pliers, to secure the clip 22a to the blade member 14a. First orifice 30a in such embodiment extends through a raised boss 31 on blade member 14a, (see FIGS. 6 and 7). Second distal end 36a of clip member 22a is, like in the previous embodiment, passed through second orifice 32 in blade 14a, to lockingly secure shaft 12 to blade 14a. Like clip member 22, clip member 22a may likewise be provided with knurled edge 40a, biased toward first distal end 34a, which underlies a portion of shaft 12 proximate orifice 26 when inserted therein, to assist in retaining clip member 22a and second distal end 36a within orifice 26. This embodiment, particularly where the clip member 22a is of metal, would require use of another tool, such as a pair of pliers, to deform the first distal end 34a, and in particular the pair of tabs 35a, 36b thereon, so as to "crimp" the clip member 22a onto the blade member 14a, and accordingly is less desirable than the design for clip member 22 shown in FIGS. 1, 2A and 2B and FIG. 5, which require no tools to retain the clip member 22 to blade 14. Nevertheless, such configuration is contemplated and included as part of the present invention to a kit and a method for assembling a tool having an elongate shaft and a blade, and a resulting tool.

Although the clip member 22 or 22a, when the second distal end 36 thereof is inserted in aperture 26, will prevent angular rotation of shaft 12 relative to blade 14, and thus serve as a shaft rotation prevention means whereby the second distal end 36, 36a of clip members 22, 22a respectively would contact a corresponding surface, namely the sides of orifice 26 on shaft 12, so as to prevent angular rotation thereof, in a preferred embodiment of the invention further shaft rotation prevention means are provided to prevent rotation of shaft 12.

Figure 3:
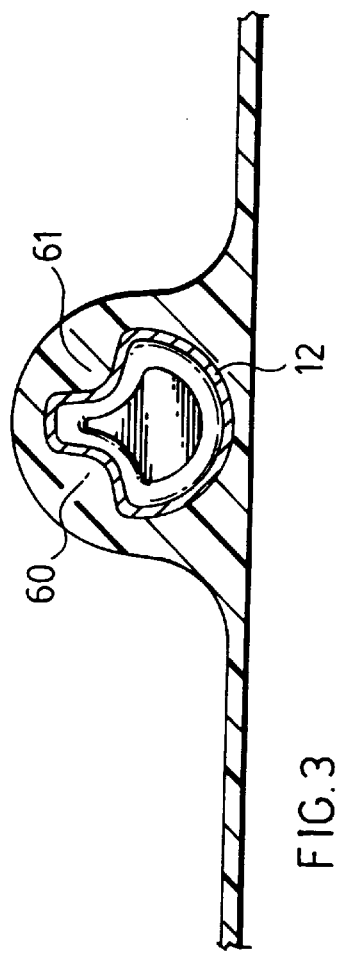
FIG. 3 is a cross-sectional view of the blade member shown in FIG. 1, taken along plane B—B of FIG. 2B.
Figure 4:
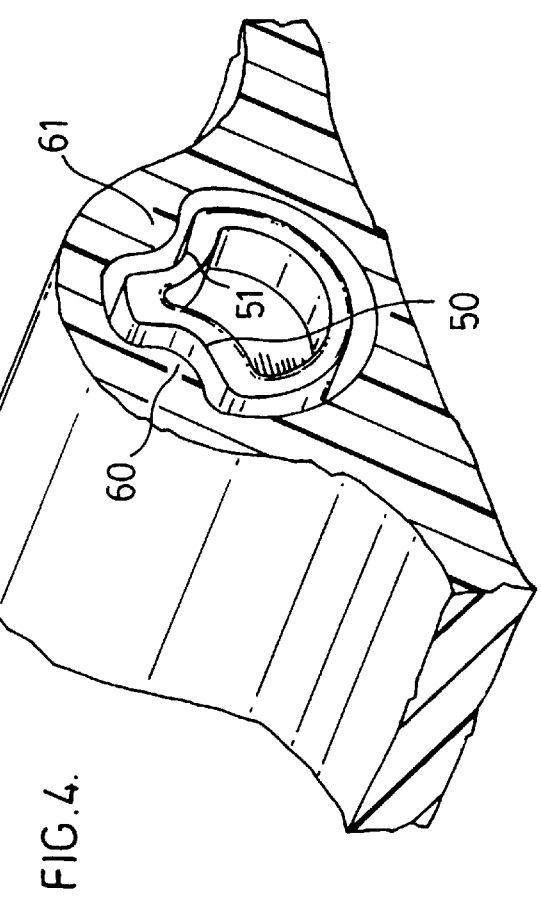
FIG. 4 is a perspective view of a cross-section through the blade member, taken along plane C—C of FIG. 2A.

Accordingly, in a further preferred embodiment of the present invention, shaft rotation prevention means are provided in the form of a pair of indentations 50, 51 on shaft 12 (see FIG. 1), and a pair of raised protuberances 60, 61 (see FIGS. 3 and 4) within said aperture 20 which extend longitudinally into aperture 20 for a portion of the length of aperture 20, as shown in FIGS. 2A and 2B, and FIG. 4. The pair of indentations 50, 51 and protuberances 60, 61 each respectively contact each other and/or matingly engage with each other in a unique angular orientation of the shaft 12 relative to the blade 14 as shown in the cross-section through the lower end of the aperture 20 shown in FIG. 3. Such mating engagement only occurs when the shaft 12 is inserted within aperture 14 to the greatest extent possible, and in the unique angular orientation when second orifice 32 is angularity oriented with orifice 26 in shaft 12, so that second orifice 32 will mutually overlie orifice 26 when shaft 12 is fully inserted in aperture 20, as shown in FIG. 2B.

Accordingly, where the tool of the present invention, and the kit including the clip member 22 or 22a for its assembly, further possesses raised protuberances 60, 61 within the aperture 20 which are adapted to matingly engage or contact indentations 50, 51 on the shaft member 12 at a unique angular orientation of the shaft 12 relative to the blade wherein the second orifice 32 is aligned so as to mutually overlie orifice 26 when the shaft 12 is inserted in blade member 14, the method of the present invention for assembling a tool further comprises, after having inserted the first distal end of clip member 22 or 22a into respective orifice 30 or 30a, and after having inserted the shaft 12 within aperture 20, rotating shaft 12 relative to blade 14 to allow protuberances 60, 61 to matingly engage indentations 50, 51 in the lower distal end 24 of shaft 12, thereby allowing more complete insertion of shaft 12 within aperture 20 and simultaneous positioning of second orifice 32 over orifice 26. Deformation of first distal end 34 of clip member 22 may occur prior to angular alignment of the indentations 50, 51 with protuberances 60, 61, or after alignment during full insertion of the shaft 12 within aperture 20.

Although the disclosure describes and illustrates preferred embodiments of the invention, it is to be understood that the invention is not limited to these particular embodiments. Many variations and modifications will now occur to those skilled in the art of tool construction. For definition of the invention reference is to be made to the appended claims.

That which is claimed is:

1. A kit for assembling a tool having an elongate shaft member and a blade member, said shaft member, proximate a lower distal end thereof having an orifice extending into a periphery thereof;

said blade member comprising:
  i) an aperture, adapted to fittingly receive therein said lower distal end of said shaft member; and
  ii) first and second orifices longitudingly spaced apart, said second orifice located on said blade member so as to mutually overlie said orifice in said shaft member when said shaft member is fittingly received within said aperture; and
a locking clip member, a first distal end thereof adapted to pass through said first orifice to permit securement of said clip member to said blade member, and a second opposite distal end thereof adapted to pass through said second orifice and said orifice in said shaft member to thereby lockingly secure said shaft member within said aperture wherein said first distal end of said clip member is adapted to be permanently deformed to permit securement to said blade member.

2. The kit as claimed in claim 1 permitting manual assembly of a tool, wherein said first distal end of said clip member is adapted, when inserted into said first orifice and when said shaft member is inserted within said aperture, to contact said shaft and be deformed so as to become secured to said blade member.

3. The kit as claimed in claim 1, said blade member further comprising shaft rotation prevention means within said aperture, adapted to matingly engage a corresponding surface on said shaft member to thereby prevent angular rotation of said shaft member within said aperture.

4. The kit as claimed in claim 3, wherein said shaft rotation prevention means comprises indentation means on said shaft member, and raised protuberance means within said aperture, wherein said raised protuberance means are adapted to matingly engage said indentation means when said shaft member is inserted within said aperture so as to prevent angular rotation of said shaft member within said aperture.

5. The kit as claimed in claim 4, wherein said indentation means comprises a pair of indentations, and said raised protuberance means comprises a pair of protuberances adapted to matingly engage said pair of indentations when said shaft member is inserted within said aperture.

6. The kit as claimed in claim 4, wherein said raised protuberance means only permit full insertion of the shaft member at a singular angular orientation of said shaft member within said aperture in said blade member, namely at an angular orientation wherein said orifice in said shaft member mutually underlies said second orifice in said blade member.

7. A tool, comprising:
an elongate shaft member having, proximate a lower distal end thereof, an orifice extending into a periphery thereof;
a blade member having an aperture, said shaft member inserted within said aperture, further having shaft rotation prevention means which matingly engage corresponding surfaces on said shaft member when said shaft member is inserted in said aperture, further comprising longitudinally spaced apart first and second orifices, said second orifice mutually overlying said orifice extending into said periphery of said shaft member; and
a locking clip member, a first distal end thereof inserted through said first orifice, and a second opposite distal end inserted through each of said second orifice and said orifice in said shaft member so as to thereby lockingly secure said shaft member within said aperture wherein said first distal and of said clip member is permanently deformed so as to be secured to said blade member.

8. The tool as claimed in claim 7, wherein said tool is manually assembleable, and said first distal end of said clip member is adapted, when inserted in said first orifice in said blade member and said shaft member subsequently inserted within said aperture, to contact said shaft member and be deformed so as to become secured to said blade member.

9. The tool as claimed in claim 7, wherein said shaft rotation prevention means comprises indentation means on said shaft member, and raised protuberance means within said aperture, wherein said raised protuberance means are adapted to matingly engage said indentation means when said shaft member is inserted within said aperture so as to prevent angular rotation of said shaft member within said aperture.

10. The tool as claimed in claim 9, wherein said indentation means comprises a pair of indentations, and said raised protuberance means comprises a pair of protuberances adapted to matingly engage said pair of indentations when said shaft member is inserted within said aperture.

11. The tool as claimed in claim 9 wherein said raised protuberance means matingly engage said indentation means at a unique angular orientation of said shaft member when said orifice in said shaft member mutually underlies said second orifice in said blade member.

12. The tool as claimed in claim 9 wherein said clip member possesses means to retain its second distal end in resilient biased engagement within said orifice in said shaft member.

13. The tool as claimed in claim 7 wherein said tool is a shovel, said shaft member is a metal shovel shaft, substantially cylindrical in shape except at its lower distal end, and hollow, and said blade member is a plastic shovel blade.

14. A method for assembling a tool from a kit consisting of:
an elongate, substantially cylindrical shaft member, a lower distal end thereof having an orifice and indentation means;
a blade member, having an aperture therein adapted to fittingly receive there within said lower distal end of said shaft member, further possessing longitudinally spaced apart first and second orifices; and
a metal locking clip member, having a first distal end and a second opposite distal end;
said method comprising:
  i) placing said first distal end of said locking clip member through said first orifice;
  ii) locating said lower distal end of said shaft member within said aperture in said blade member, and rotating said shaft member relative to said blade member to allow said second orifice in said blade member to mutually overlie said orifice in said shaft member; and
  iii) pressing said second distal end of said clip member through said second orifice in said blade member and into said orifice in said shaft member to thereby cause said shaft member to become lockingly engaged to said blade member wherein said first distal and of said clip member is inserted into said first orifice in said blade member and permanently deformed so as to secure said clip member to said blade member.

15. The method for manually assembling a tool as claimed in claim 14, wherein said first distal end of said clip member, when said shaft member is inserted into said aperture, is caused to contact said shaft member and be deformed by said shaft member so as to secure said clip member to said blade member.

16. The method for manually assembling a tool as claimed in claim 15, wherein said first distal end of said clip member upon deformation is sandwiched between said shaft member and side surfaces of said aperture, causing said clip member to be thereby secured to said blade member.

17. The method for manually assembling a tool is claimed in claim 14, said placement of said first distal end of said locking clip member allowing said distal end thereof to extend into said aperture;

at the time of locating said lower distal end of the shaft member within said aperture, contacting said first distal end of said locking clip member with said shaft member to permanently deform, said distal end so as to secure said clip member to said blade member.

18. The method for manually assembling a tool from a kit as claimed in claim 14, wherein said aperture further possesses there within raised protuberance means adapted to matingly engage indentation means on said shaft member, at a unique angular orientation in which said second orifice mutually overlies said orifice in said shaft member, said method further comprising:

rotating said shaft member relative to said blade member to allow said raised protuberance means in said aperture to matingly engage at a unique angular orientation, said indentation means in said lower distal end of said shaft member, thereby allowing complete insertion of said shaft member within said aperture and simultaneously allowing said second orifice in said blade member to mutually overlie said orifice in said shaft member.

19. The method for assembling a tool as claimed in claim 18, wherein said indentation means comprises a pair of indentations, and said raised protuberance means comprises a pair of protuberances, and causing said pair of protuberances to matingly engage said pair of indentations on said lower distal end of said shaft member when locating said shaft member within said aperture.

* * * * *